United States Patent
Nara et al.

(10) Patent No.: US 6,597,719 B1
(45) Date of Patent: Jul. 22, 2003

(54) ONCE THROUGH FAN FOR GAS LASER APPARATUS AND GAS LASER APPARATUS THEREWITH

(75) Inventors: Hisashi Nara, Hiratsuka (JP); Natsushi Suzuki, Oyama (JP)

(73) Assignee: Komatsu Ltd., Tokyo (JP)

( * ) Notice: Subject to any disclaimer, the term of this patent is extended or adjusted under 35 U.S.C. 154(b) by 325 days.

(21) Appl. No.: 09/642,024

(22) Filed: Aug. 21, 2000

(51) Int. Cl.[7] .................................................. H01S 3/10
(52) U.S. Cl. ........................................................ 372/55
(58) Field of Search ................................ 372/55, 63, 58

(56) References Cited

U.S. PATENT DOCUMENTS

| | | | | |
|---|---|---|---|---|
| 5,018,314 A | * | 5/1991 | Fushiya et al. | 451/357 |
| 5,083,052 A | * | 1/1992 | Ochi | 310/64 |
| 5,114,657 A | * | 5/1992 | Miyajima | 264/334 |
| 5,156,056 A | * | 10/1992 | Pittman et al. | 74/5.6 |
| 5,297,926 A | * | 3/1994 | Negishi | 415/90 |
| 5,391,066 A | * | 2/1995 | Sawai et al. | 418/55.6 |
| 5,584,657 A | * | 12/1996 | Scarfer | 416/144 |
| 5,666,015 A | * | 9/1997 | Uchibori et al. | 310/261 |
| 5,815,328 A | * | 9/1998 | Makita | 359/824 |
| 6,024,921 A | * | 2/2000 | Freiner et al. | 422/66 |
| 6,145,482 A | * | 11/2000 | Blount | 123/45 A |
| 6,337,872 B1 | * | 1/2002 | Nara et al. | 372/58 |
| 6,351,937 B1 | * | 3/2002 | Matsuda et al. | 60/805 |

FOREIGN PATENT DOCUMENTS

| | | |
|---|---|---|
| JP | 9-317686 | 12/1997 |
| JP | 2000-133860 | 5/2000 |

* cited by examiner

*Primary Examiner*—Paul Ip
*Assistant Examiner*—Phillip Nguyen
(74) *Attorney, Agent, or Firm*—Armstrong, Westerman & Hattori, LLP

(57) ABSTRACT

The invention provides a method of adjusting a rotational balance of a once through fan for a gas laser apparatus. In a gas laser apparatus having a laser chamber for charging a laser gas and a once through fan for circulating and driving the laser gas, a mounting hole for mounting a balance weight for adjusting a rotational balance of the once through fan is provided on a peripheral edge surface of a blade supporting plate for supporting a blade portion of the once through fan.

4 Claims, 10 Drawing Sheets

US 6,597,719 B1

ONCE THROUGH FAN FOR GAS LASER APPARATUS AND GAS LASER APPARATUS THEREWITH

FIELD OF THE INVENTION

The present invention relates to a once through fan for a gas laser apparatus provided with a rotational balance adjusting mechanism, a gas laser apparatus in which the once through fan is assembled, and a method of adjusting a rotational balance of the once through fan.

BACKGROUND OF THE INVENTION

In conventional, there has been known a gas laser apparatus employing a once through fan as a blower for circulating and driving a laser gas, for example, the gas laser apparatus is shown in Unexamined Japanese Patent Publication No. 2000-133860 (hereinafter, refer to a first publication). FIG. 10 shows a gas laser apparatus disclosed in the first publication, and a description will be given below of a conventional art with reference to FIG. 10.

In FIG. 10, a gas laser apparatus 1 is provided with a laser chamber 2 for sealing a laser gas corresponding to a laser medium. Discharge electrodes (not shown) for generating electric discharge so as to excite a laser gas and oscillate a laser beam are arranged in an inner portion of the laser chamber 2 in an opposing manner. Further, once through fan 114 for circulating the laser gas within the laser chamber 2 so as to feed to a portion between the discharge electrodes is placed at a predetermined position in the inner portion of the laser chamber 2.

The once through fan 114 is provided with a blade portion 133 having a plurality of blades, blade supporting plates 134 and 134 disposed on both side surfaces of the once through fan 114 and supporting the blade portion 133, and rotary shafts 135 and 135 respectively adhered to the blade supporting plates 134 and 134. The rotary shafts 135 and 135 are rotatably supported by magnetic bearings 139 and 139 and a motor 138 drives the rotary shaft 135 so as to rotate the blade portion 133, thereby circulating the laser gas.

However, in the conventional art disclosed in the first publication, there are problems mentioned below. That is, since the once through fan 114 rotates within the laser chamber at a high speed, it is necessary to adjust a rotational balance so as to prevent a vibration. When rotating the once through fan 114 having the rotational balance unadjusted at a high speed, a vibration is generated in the laser chamber 2, so that an alignment of optical parts such as a mirror (not shown) and the like is shifted, whereby there is a case that a power of the laser beam is reduced and a wavelength is shifted from a predetermined value. Further, when the vibration is great, there is a problem that a service life of magnetic bearings 139 and 139 or the like becomes short. However, the first publication does not include a description concerning an adjustment of the rotational balance of the once through fan 114.

As the rotational balance adjusting means of the once through fan 114, for example, there has been known a structure shown in Unexamined Japanese Publication No. 9-317686 (hereinafter, refer to a second publication). FIG. 11 shows a balance adjusting apparatus of the once through fan 114 disclosed in the second publication. As shown in FIG. 11, the once through fan 114 is mounted on a rotational balance adjusting apparatus called as a balancing machine 19 and is rotated on the balancing machine 19, whereby a rotational balance is judged. Further, the rotational balance of the once through fan 114 is adjusted, for example, by attaching a weight (not shown) called as a balance weight to the blade supporting plate 134 and cutting and removing a part of the blade supporting plate 134. That is, in accordance with the conventional art, the once through fan 114 is attached to the inner portion of the laser chamber 2 after the rotational balance thereof is singly adjusted on the balancing machine 19.

However, when attaching the once through fan 114 to the laser chamber 2, a supporting condition for axially supporting the rotary shaft 135 of the once through fan 114 is changed due to a difference between a rigidity of the laser chamber 2 and a rigidity of the balancing machine 19 and the like. Accordingly, there is a problem that the vibration of the once through fan 114 is increased, so that the power of the laser beam is reduced as mentioned above and the wavelength is shifted.

Further, at a time of oscillating the laser, the laser gas having a density different from that of the atmospheric air is charged within the laser chamber 2 at a pressure different from that of the atmospheric pressure. Accordingly, even when adjusting the rotational balance of the once through fan 114 in the atmospheric air, there is a case that the rotational balance of the once through fan 114 is shifted and the vibration is increased by charging the laser gas into the laser chamber 2.

Further, in the case of employing the laser beam as a processing light source, in order to improve a processing speed, there is a requirement of increasing an output of the laser beam and increasing an oscillating frequency of the laser beam for oscillating pulses. Accordingly, since a vibration between the discharge electrodes is increased by making the once through fan 114 large and increasing a rotational number of the once through fan 114, it is required to further accurately adjust the balance.

In particular, in the case of employing the laser beam as the light source for a lithography process, it is necessary to provide a wavelength control apparatus (not shown) in the gas laser apparatus 1 and accurately control the wavelength of the laser beam. Accordingly, it is necessary to prevent a fine vibration of the once through fan 114, so that it is insufficient to adjust the rotational balance in accordance with the conventional art.

SUMMARY OF THE INVENTION

The present invention is made by solving the problems in the conventional art, and an object of the present invention is to provide a once through fan for a gas laser apparatus having a small vibration, a gas laser apparatus provided with the once through fan for the laser apparatus, and a method of adjusting a rotational balance of a once through fan for a gas laser apparatus.

In order to achieve the object mentioned above, in accordance with the present invention, there is provided a once through fan for a gas laser apparatus circulating and driving a laser gas charged within a laser chamber, wherein a mounting hole for mounting a balance weight for adjusting a rotational balance of the once through fan is provided on a peripheral edge surface of a blade supporting plate for supporting a blade portion of the once through fan.

In accordance with the structure mentioned above, for example, at a time of adjusting the rotational balance after assembling the once through fan in the gas laser apparatus, it is possible to attach and detach the balance weight from a front surface of the once through fan. Accordingly, in comparison with the case of attaching and detaching the balance weight with respect to a side surface of the once through fan, it is not necessary for an operator to insert hands thereof between the side surface of the once through fan and the laser chamber so as to treat, so that the operation can be easily performed.

Further, in accordance with the present invention, there is provided a gas laser apparatus comprising:

a laser chamber for charging a laser gas; and a once through fan for circulating and driving the laser gas within the laser chamber, wherein a mounting hole for mounting a balance weight for adjusting a rotational balance of the once through fan is provided on a blade supporting plate for supporting a blade portion of the once through fan.

In accordance with the structure mentioned above, it is possible to easily attach and detach the balance with respect to the mounting hole so as to adjust the rotational balance of the once through fan after placing the once through fan within the laser chamber. Accordingly, in comparison with the case of singly adjusting the rotational balance of the once through fan, it is possible to more accurately adjust the rotational balance and the vibration of the once through fan can be reduced.

Further, the gas laser apparatus may be structured such that the mounting hole for attaching the balance weight is provided on a peripheral edge surface of the blade supporting plate for supporting the blade portion.

In accordance with the structure mentioned above, for example, in comparison with the case of attaching and detaching the balance weight with respect to the side surface of the once through fan, there is not required a gap for inserting a tool or the like for mounting the balance weight to the portion between side surface of the once through fan and the laser chamber. Accordingly, it is possible to move the blade supporting plate to the inner wall of the laser chamber and it is possible to make an excimer laser apparatus compact. Further, since it is accordingly possible to shorten an interval between bearings for supporting the blade supporting plate, a rigidity of the once through fan is increased and a vibration can be reduced.

Further, in accordance with the present invention, there is provided a method of adjusting a rotational balance of a once through fan for a gas laser apparatus for circulating and driving a laser gas charged within a laser chamber, wherein a rotational balance is adjusted after attaching the once through fan to an inner portion of the laser chamber.

In accordance with the method mentioned above, since it is possible to adjust the rotational balance of the once through fan in accordance with the same condition as that of oscillating the laser, it is possible to more accurately adjust the rotational balance. Accordingly, the vibration of the once through fan can be reduced and a power reduction and a wavelength shift of the laser become small.

BEST MODE FOR CARRYING OUT THE INVENTION

A description will be in detail given below embodiments in accordance with the present invention with reference to the accompanying drawings. In each of the embodiments, a description will be given of an excimer laser apparatus as an embodiment of a gas laser apparatus.

Figure 1:
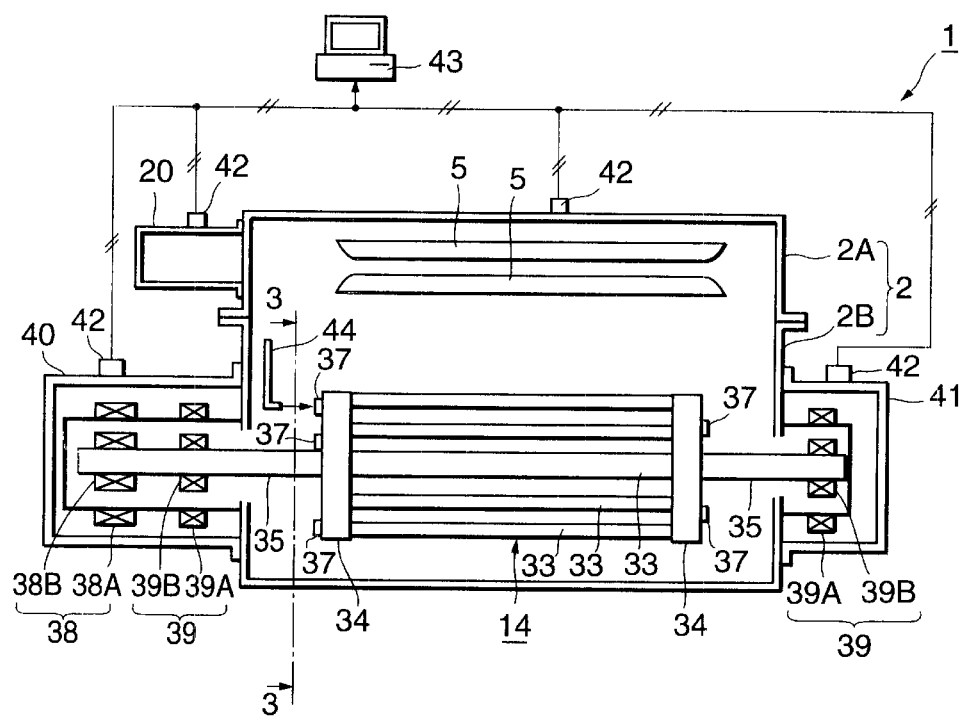
FIG. 1 is a schematic view which shows a structure of an excimer laser apparatus in accordance with a first embodiment of the present invention.

At first, a description will be given of a first embodiment. FIG. 1 is a schematic view of an excimer laser apparatus in accordance with the first embodiment. In FIG. 1, the excimer laser apparatus is provided with a laser chamber 2 which stores a laser gas corresponding to a laser medium charged therein and can be freely separated into an upper chamber 2A and a lower chamber 2B. Discharge electrodes 5 and 5 generating an electric discharge and exciting the laser gas so as to oscillate a laser beam are arranged in an inner portion of the upper chamber 2A in an opposing manner. For example, a mixed gas comprising a fluorine, a helium, a krypton and a neon is employed for the laser gas.

A spectral-narrowing apparatus 20 for narrowing a spectrum width of the laser beam so as to spectral-narrow is placed at the rear (in a left portion in FIG. 1) of the laser chamber 2. A grating (not shown) or the like is arranged in an inner portion of the spectral-narrowing apparatus 20. Further, a once through fan 14 for circulating the laser gas within the laser chamber 2 so as to feed to a portion between the discharge electrodes and a heat exchanger (not shown) for cooling the laser gas to which a heat is given due to an electric discharge are respectively placed at predetermined positions.

The once through fan 14 is provided with a blade portion 33 having a plurality of blades, blade supporting plates 34 and 34 supporting the blade portion 33 and disposed in both side surfaces of the blade portion 33, and rotary shafts 35 and 35 respectively adhered to substantially center portions of the blade supporting plates 34 and 34. Both end portions of the rotary shafts 35 and 35 are rotatably supported by non-contact magnetic bearings 39 and 39 respectively placed within a bearing housing 41 and a motor housing 40. Each of these magnetic bearings 39 is provided with an inner wheel magnetic body 39B annularly attached to an outer peripheral surface of the rotary shaft 35 and integrally rotating with the rotary shaft 35, and an outer wheel electromagnetic coil 39A annularly surrounding an outer periphery of the inner wheel magnetic body 39B at a predetermined interval. Then, the outer wheel electromagnetic coil 39A is energized by current introducing means (not shown), whereby a sucking force or a repulsion force is generated with respect to the inner wheel magnetic body 39B and the rotary shaft 35 is rotatably supported in a non-contact state.

Further, the once through fan 14 is driven by a motor 38 placed within the motor housing 40. The motor 38 is provided with a rotor 38B annularly attached to an outer peripheral surface of the rotary shaft 35, and a stator 38A annularly surrounding an outer periphery of the rotor 38B at a predetermined interval. The stator 38A is constituted by an iron core and a coil and the coil is energized, thereby generating a rotational magnetic field in an inner peripheral portion thereof so as to rotate the rotor 38B and drive the rotary shaft 35.

Further, vibration measuring devices 42 are respectively attached to an outer surface of the laser chamber 2, the motor housing 40, the bearing housing 41 and the spectral-narrowing apparatus 20. Each of the vibration measuring devices 42 is electrically connected to a vibration analyzing apparatus 43 constituted by a personal computer or the like. The vibration analyzing apparatus 43 analyzes the vibration of the laser chamber 2 on the basis of an electric signal output from the vibration measuring device 42 so as to calculate adjustment data for adjusting the rotational balance of the once through fan 14.

Figure 2:
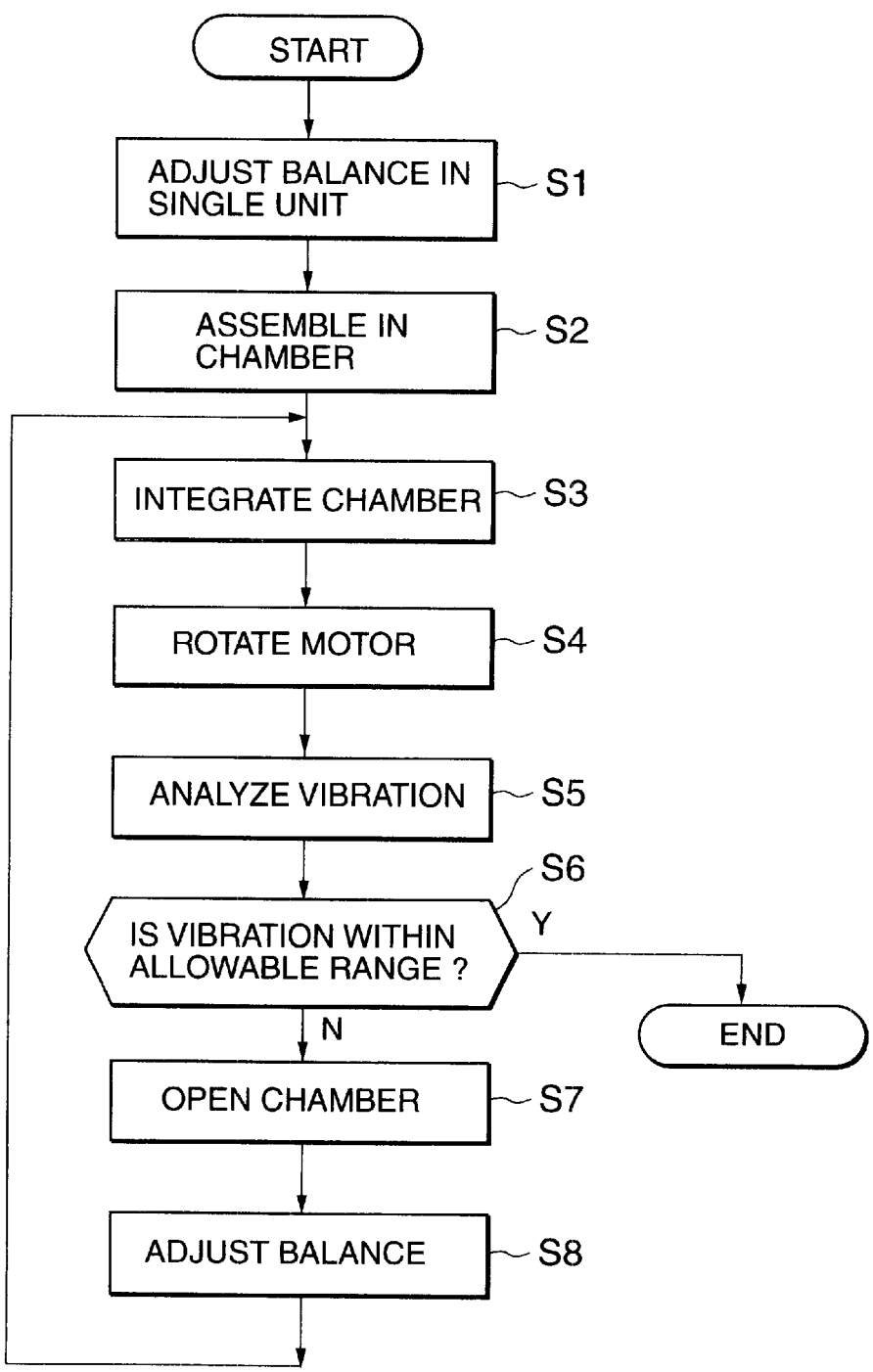
FIG. 2 is a flow chart showing an example of a procedure for adjusting a rotational balance of a once through fan in accordance with the first embodiment.

An example of a procedure for adjusting the rotational balance of the once through fan 14 is shown in FIG. 2 by a flow chart in which reference symbol S is attached to each of step numbers.

Figure 11:
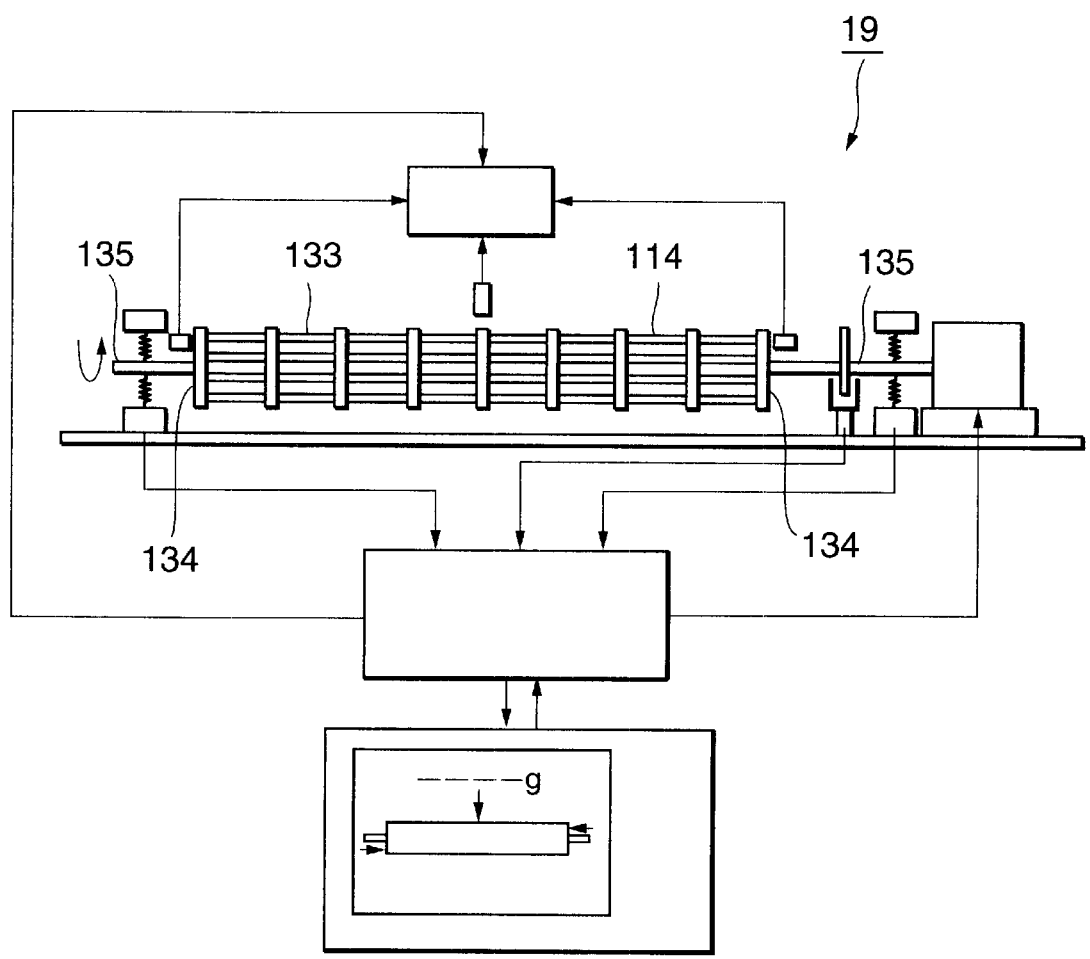
FIG. 11 is a schematic view which shows a method of adjusting a balance of a once through fan in accordance with the conventional art.

At first, for example, by using the balancing machine 19 shown in FIG. 11, the rotational balance is adjusted in a single body of the once through fan 14 (step S1). Next, the balance weight 37 is attached to the blade supporting plate 34 in the once through fan 14 so as to break the rotational balance and the once through fan 14 is assembled in the lower chamber 2B (step S2). The upper chamber 2A and the lower chamber 2B are assembled so as to integrally form the laser chamber 2 (step S3). Then, the motor 38 is rotated (step S4). The vibration of the laser chamber 2 is analyzed by the vibration analyzing apparatus 43 (step S5). On the basis of the analyzed result, it is judged whether or not the vibration transmitted to the vibration measuring device 42 is within a predetermined range (step S6). When the vibration transmitted to the vibration measuring device 42 is within the predetermined range, the adjustment of the rotational balance is finished.

Further, in the case that the vibration is over the predetermined range in the step S6, the upper chamber 2A and the lower chamber 2B are separated so as to open the laser chamber 2 (the step S7). Then, on the basis of the result of the vibration analysis in the step S5, the balance weight 37 is attached to and detached from the blade supporting plate 34 of the once through fan 14 so as to adjust the rotational balance (the step S8), thereafter the step returns to the step S3. In the manner mentioned above, the rotational balance is adjusted until the vibration becomes within the predetermined range.

Figure 3:
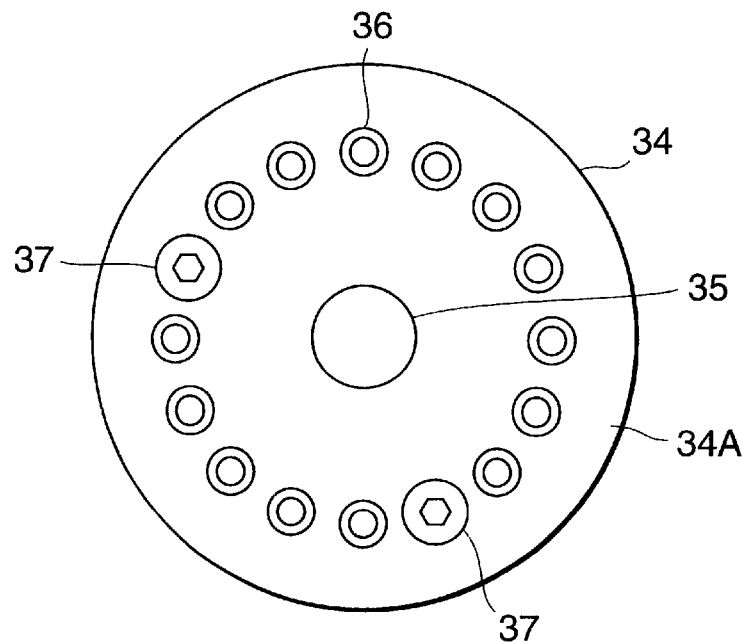
FIG. 3 is a view taken along a line 3—3 in FIG. 1 and a schematic view of a blade supporting plate of the once through fan.

Next, a description will be given of attaching and detaching of the balance weight 37 in the steps S2 and S6. FIG. 3 shows a view taken along a line 3—3 in FIG. 1. As shown in FIG. 3, a flat plate surface 34A of the blade supporting plate 34 as seen from the side surface of the once through fan 14 is formed in a disc shape, and a plurality of screw holes 36 are circumferentially provided on the flat plate surface 34A. Then, the rotational balance of the once through fan 14 is adjusted, for example, by screwing and fixing a stainless bolt as the balance weight 37. That is, the screw hole 36 corresponds to a mounting hole for the balance weight 37. At a time of screwing the bolt or the like, for example, a tool 44 shown in FIG. 1 is used. As the balance weight 37, a washer, a plate-like member having a predetermined weight or the like may be fixed by a bolt as occasion demands.

In this case, the rotational number of the motor 38 in the step S4 mentioned above may be set to be substantially the same as the rotational number at a time of performing a laser oscillation or a little higher. Accordingly, since the load applied to the once through fan 14 is increased and the vibration is analyzed in a state that crumbling of the rotational balance is increased, it is possible to further accurately adjust the rotational balance so as to restrict the vibration.

Further, when an inert gas such as a nitrogen, a helium or the like is charged within the laser chamber 2 until substantially the same pressure as that of the laser gas at a time of rotating the motor 38, the load applied to the once through fan 14 becomes substantially the same as that at a time of oscillating the laser. When adjusting the rotational balance in this state, it is possible to further accurately adjust. At this time, when the weight of the introduced inert gas is substantially the same as that of the laser gas, it is possible to further accurately adjust. Further, the motor 38 may be rotated in the state of charging the laser gas (fluorine or the like), and the gas obtained by removing a halogen gas from the laser gas may be charged.

As mentioned above, in accordance with the first embodiment, the structure is made such as to adjust the rotational balance after assembling the once through fan 14 within the laser chamber 2. Accordingly, since the rotational balance can be adjusted by setting the condition concerning the vibration such as the rigidity of the laser chamber 2 or the like to be the same as that at a time of oscillating the laser, the rotational balance can be accurately adjusted. Accordingly, the vibration of the once through fan 14 can be further restricted, the alignment of the optical parts is not shifted, and it is possible to obtain the laser beam having a stable output and wavelength.

Further, the structure is made such that the balance weight 37 is mounted by screwing to the screw hole 36. Accordingly, for example, in comparison with the case of mounting the balance weight 37 by caulking and laser processing the blade portion 33 of the fan as in the conventional art, the balance weight 37 can be easily taken out and the rotational balance can be easily adjusted. Further, since the balance weight 37 can be firmly fixed to the once through fan 14 by the simple means mentioned above, the balance weight 37 is not taken out within the laser chamber 2.

Figure 4:
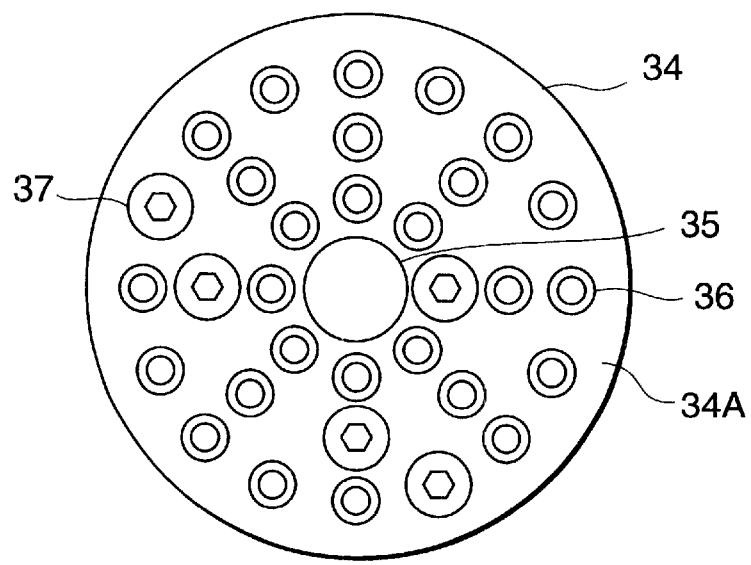
FIG. 4 is a schematic view which shows another embodiment of a blade supporting plate in accordance with the first embodiment.

FIG. 4 shows another structure of the blade supporting plate 34 in accordance with the first embodiment. In FIG. 4, a plurality of screw holes 36 are coaxially provided on the flat plate surface 34A of the blade supporting plate 34. In the once through fan 14 having the blade supporting plate 34, it is possible to further delicately adjust the rotational balance by changing a radial distance from a center of the rotary shaft 35.

Next, a description will be given of a second embodiment.

Figure 5:
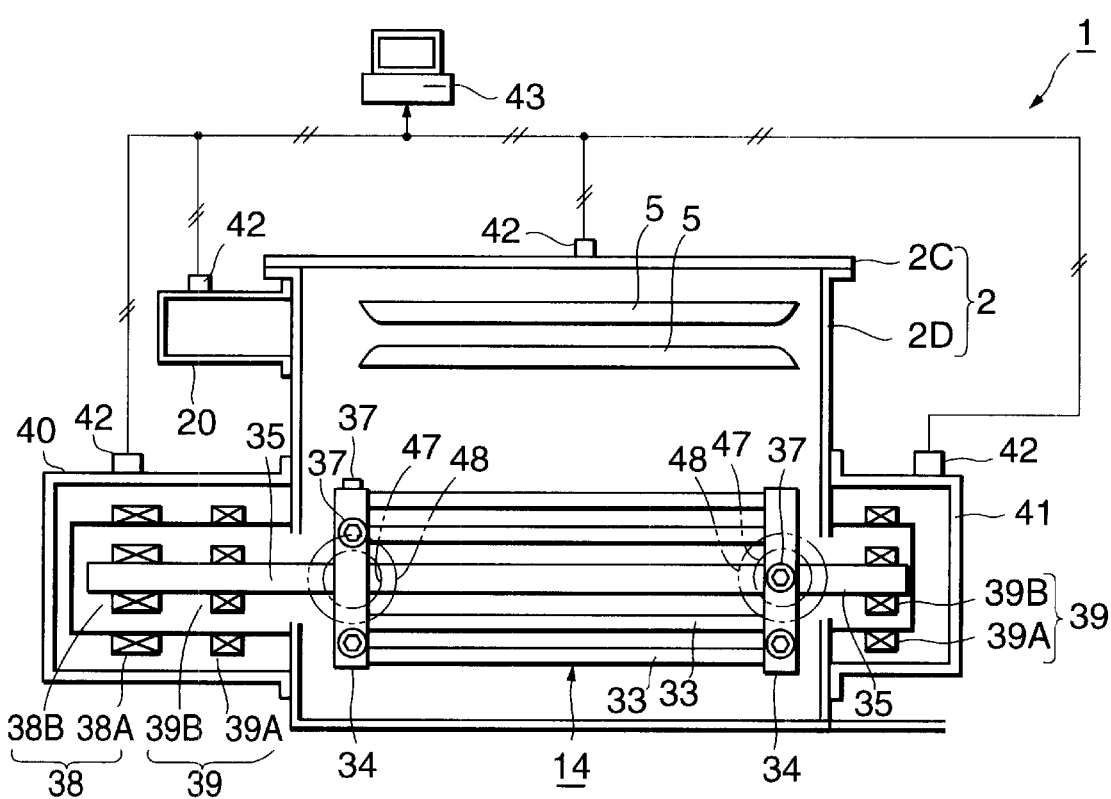
FIG. 5 is a schematic view which shows a structure of an interior portion of a laser chamber in an excimer laser apparatus in accordance with a second embodiment of the present invention.
Figure 6:
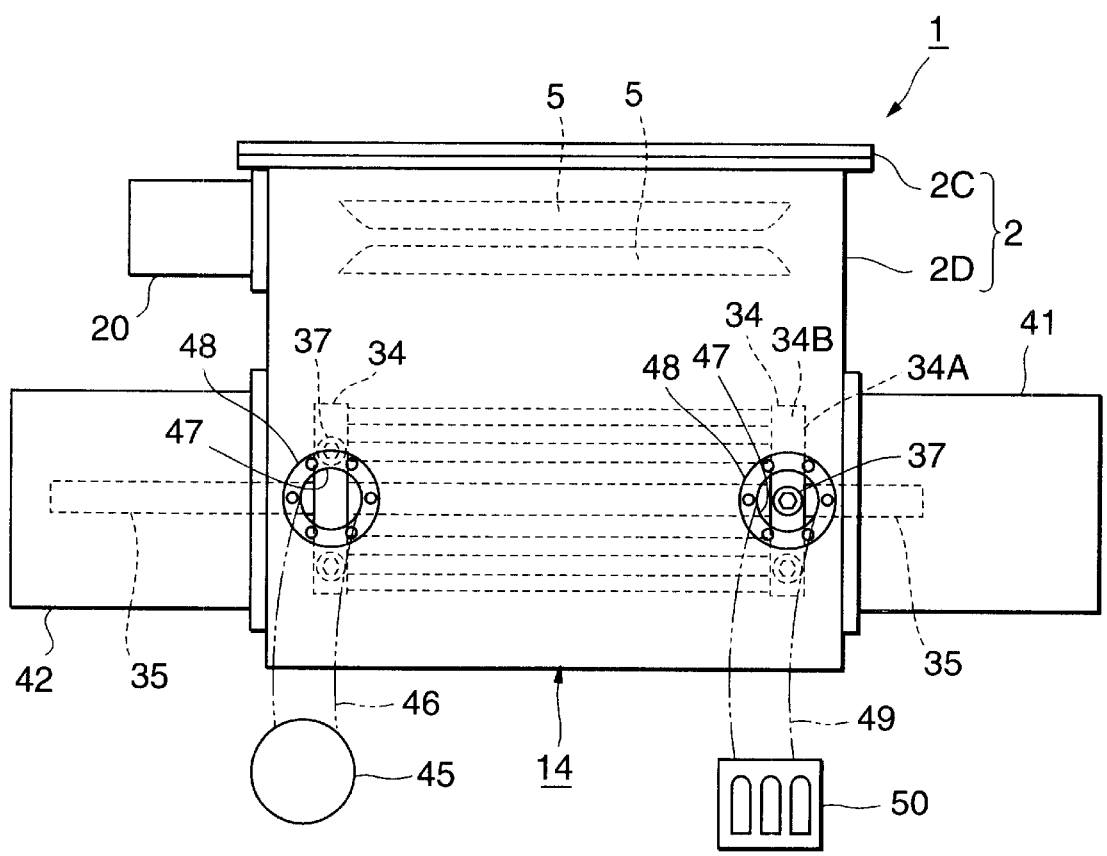
FIG. 6 is a schematic view which shows a structure of an exterior portion of the laser chamber in the excimer laser apparatus in accordance with the second embodiment.

FIGS. 5 and 6 show a structure of an excimer laser apparatus 1 in accordance with a second embodiment. FIG. 5 shows an inner portion of the laser chamber 2 and FIG. 6 is a view showing an outer side of the laser chamber 2. In FIG. 5, the excimer laser apparatus is provided with a hollow-shaped main body portion 2D having an opening portion in an upper portion, and a chamber cover portion 2C for closing the opening portion of the main body portion 2D. Discharge electrodes 5 and 5 for generating an electric discharge so as to excite the laser gas and generate the laser beam, and the once through fan 14 for circulating the laser gas within the laser chamber 2 so as to feed to the portion between the discharge electrodes 5 and 5 are respectively placed at the predetermined positions within the laser chamber 2.

As shown in FIG. 6, right and left two opening portions 47 and 47 having such a diameter that, for example, the operator can enter his hand are provided in a front side in the lower portion of the laser chamber 2, and flanges 48 and 48 are adhered to the respective opening portions 47 and 47. At a time of oscillating the laser beam, a vacuum pump 45 for evacuating the laser chamber 2 is connected to one flange 48 (a left side in FIG. 6) via a vacuum pipe 46. Further, a group of laser gas bombs 50 for introducing the laser gas to the laser chamber 2 are connected to another flange 48 via a gas pipe 49.

Figure 7:
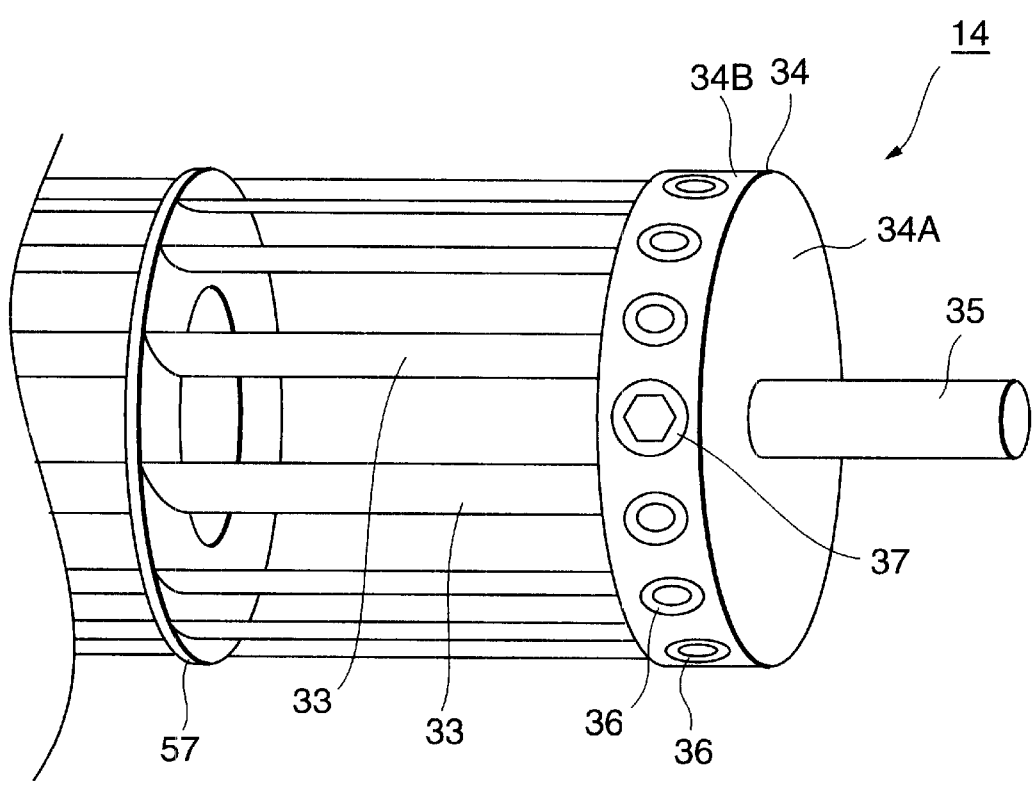
FIG. 7 is a perspective view which shows details near the blade supporting plate of the once through fan.

FIG. 7 shows details near the blade supporting plate 34 of the once through fan 14. In FIG. 6, the screw holes 36 for fixing the balance weight 37 at a substantially uniform interval are provided on the peripheral edge surface 34B of the blade supporting plate 34. Since this peripheral edge surface 34B corresponds to a front surface of the once through fan 14, it is possible to fix the bolt to the screw hole 36 from the opening portion 47 of the flange 48 and disengage the bolt fixed to the screw hole 36, as shown in FIG. 5. Further, the blade supporting plate 57 for supporting the blade portion 33, for example,.formed in a donut disc shape, is fitted between the blade supporting plates 34 and 34 at both ends.

Figure 8:
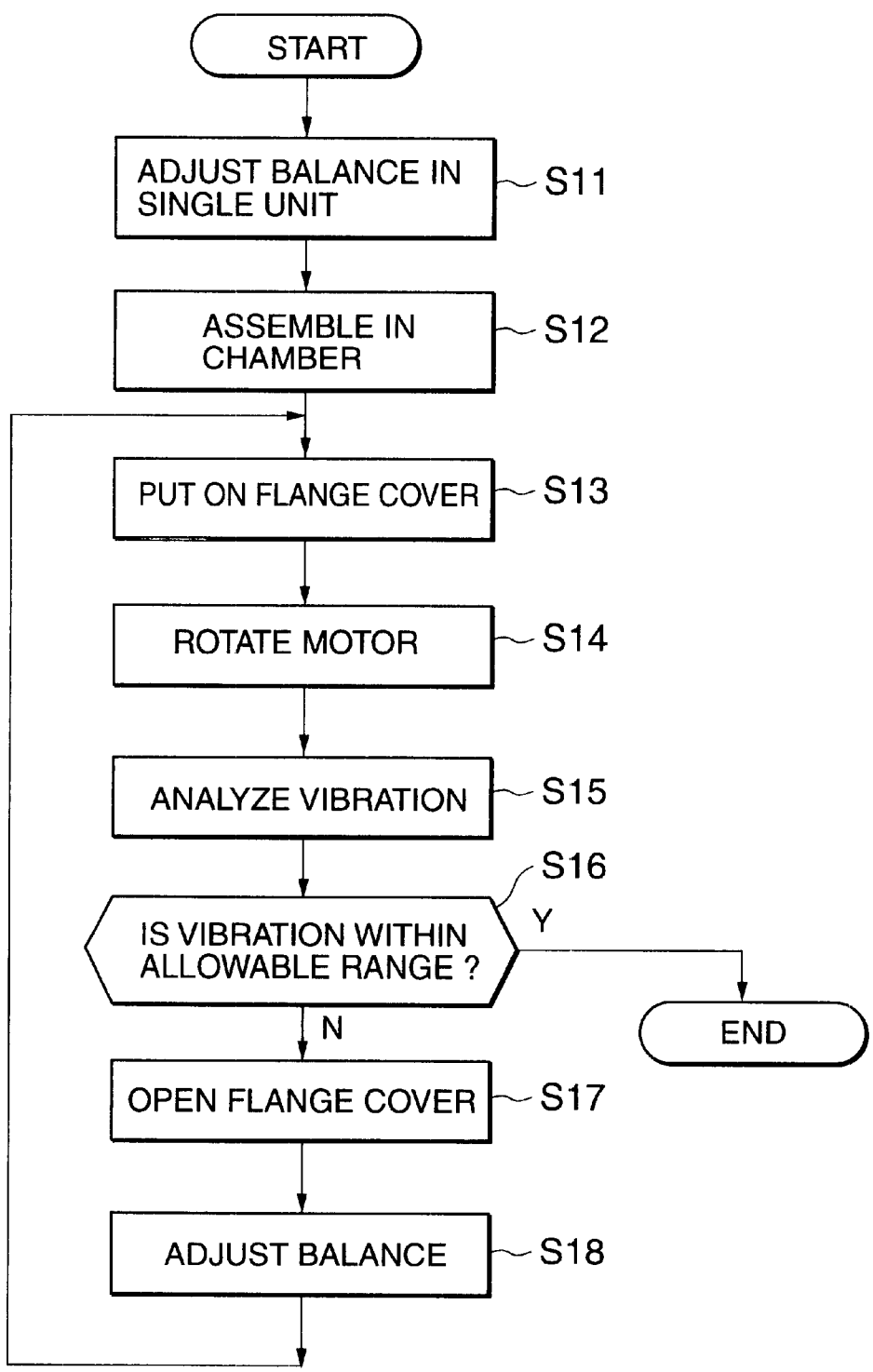
FIG. 8 is a flow chart which shows an example of a procedure for adjusting a rotational balance of the once through fan in accordance with the second embodiment.

An example of a procedure for adjusting the rotational balance of the once through fan 14 in accordance with the second embodiment is shown in FIG. 8 by a flow chart in which reference symbol S is attached to each of step numbers.

At first, the rotational balance is adjusted in a single body of the once through fan 14 (step S11). Next, the balance weight 37 is attached to the blade supporting plate 34 in the once through fan 14 so as to break the rotational balance and the once through fan 14 is assembled in the laser chamber 2 (step S12). A flange cover (not shown) for closing the opening portion 47 is put on the flange 48 (step S13). Then, the motor 38 is rotated (step S14). The vibration of the laser chamber 2 is analyzed by the vibration analyzing apparatus 43 (step S15). On the basis of the analyzed result, it is judged whether or not the vibration transmitted to the vibration measuring device 42 is within a predetermined range (step S16). When the vibration transmitted to the vibration measuring device 42 is within the predetermined range, the adjustment of the rotational balance is finished.

Further, in the case that the vibration is over the predetermined range in the step S16, the flange cover is opened (the step S17). On the basis of the result of the vibration analysis in the step S15, the balance weight 37 is attached to and detached from the blade supporting plate 34 of the once through fan 14 so as to adjust the rotational balance (the step S18), thereafter the step returns to the step S13. In the manner mentioned above, the rotational balance is adjusted until the vibration becomes within the predetermined range.

As mentioned above, in accordance with the second embodiment, the structure is made such that the screw hole 36 for mounting the balance weight 37 is provided on the peripheral edge surface 34B of the blade supporting plate 34 in the once through fan 14. Accordingly, in comparison with the first embodiment, a gap for inserting the tool for mounting the balance weight 37 is not required between the blade supporting plate 34 and the inner wall of the laser chamber 2. Therefore, in comparison with the first embodiment, it is possible to make the laser chamber 2 compact. Further, since the magnetic bearings 39 and 39 for supporting the rotary shafts 35 and 35 of the once through fan 14 are disposed near the blade supporting plates 34 and 34 and the interval between the magnetic bearings can be made narrow, the rigidity of the once through fan 14 can be increased and the vibration can be restricted. In particular, in the case of using the bearing being non-contact and having a low rigidity such as the magnetic bearing 39, an effect of restricting the vibration can be significantly obtained.

Further, since the screw hole 36 for mounting the balance weight 37 is provided on the peripheral edge surface 34B of the blade supporting plate 34, it is possible to adjust the mounting position of the balance weight 37, for example, only by taking out the flange cover. Accordingly, as in the first embodiment, it is not necessary to open the laser chamber 2 at a time of adjusting the rotational balance and the labor and time required for adjusting the rotational balance can be reduced.

Further, at a time of attaching and detaching the balance weight 37 with respect to the blade supporting plate 34 of the once through fan 14, the opening portion 47 for discharging the laser chamber 2 by the vacuum pump 45 and the opening for introducing the laser gas are used. Accordingly, it is not necessary to newly provide an opening portion for attaching and detaching the balance weight 37. In this case, in the description of the second embodiment, the opening portion 47 is set to the size in which the hand can be inserted, however, the structure is not limited to this. For example, in the case of attaching and detaching the balance weight 37 by using a long screw driver or a wrench, since the rotational balance can be adjusted even when the hand of the operator is out of the laser chamber 2, the opening portion 47 may be small.

Otherwise, the rotational balance of the once through fan 14 may be adjusted by opening the chamber cover portion 2C for closing the upper portion of the laser chamber 2. In this case, the labor for opening the chamber cover portion 2C is required, however, there is not required the gap for inserting the tool for mounting the balance weight 37 between the blade supporting plate 34 and the inner wall of the laser chamber 2. Accordingly, in comparison with the first embodiment, it is possible to make the laser chamber 2 compact.

Further, in the case that the rotational balance of the once through fan 14 in accordance with the second embodiment is shifted, for example, during the laser oscillation or the like, at first, the laser gas within the laser chamber 2 is evacuated. It is preferable that thereafter, the vacuum pipe 46 is taken out while introducing the inert gas to the laser chamber 2 via the gas pipe 49 a little by a little, and the balance weight 37 is attached and detached. At a time of adjusting the balance weight 37 of the blade supporting plate 34 in the side in which the gas pipe 49 is connected, the gas pipe 49 is independently connected to the flange 48 to which the vacuum pipe 46 is connected and the inert gas is introduced to the laser chamber 2 a little by a little.

Accordingly, the inner portion of the laser chamber 2 is always filled with the inert gas, and the extra inert gas is continuously discharged from the opening portion 47. Therefore, as is different from the first embodiment in which the laser chamber 2 is separated, a possibility that the inner wall of the laser chamber 2 and the once through fan 14 is exposed to the air is a little. As a result, it is possible to prevent water and impurities contained in the air from being attached to the inner wall of the laser chamber 2, the once through fan 14 and the like so as to pollute the laser gas and prevent the power of the laser beam from being reduced. Further, it is not necessary to perform an operation called as a passivation for electrically discharging for a long period so as to remove the attached water and impurities, in order to avoid the power reduction of the laser beam due to the attachment of the water and the impurities. Accordingly, a term that the excimer laser apparatus 1 rests after the rotational balance is adjusted is reduced, and a rate of operation of the excimer laser apparatus 1 is improved.

Figure 9:
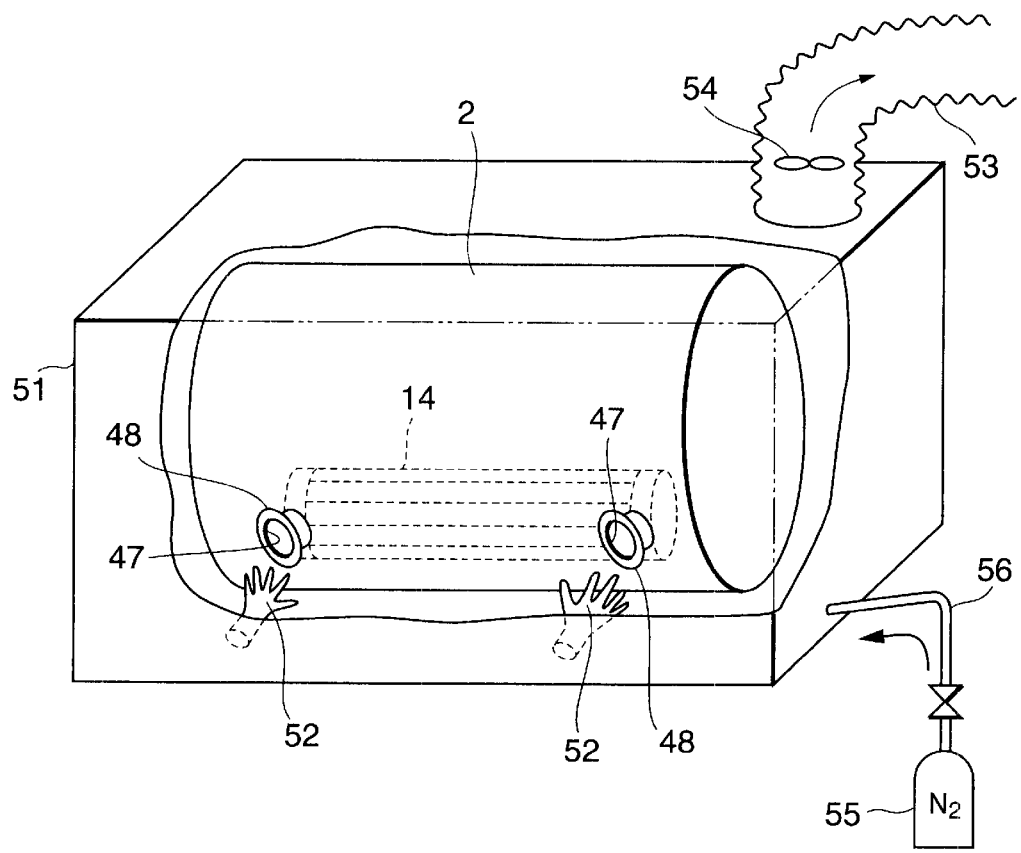
FIG. 9 is a schematic view which shows adjusting means for inserting a laser chamber in accordance with the second embodiment to an inner portion of a glove box so as to adjust a rotational balance.
Figure 10:
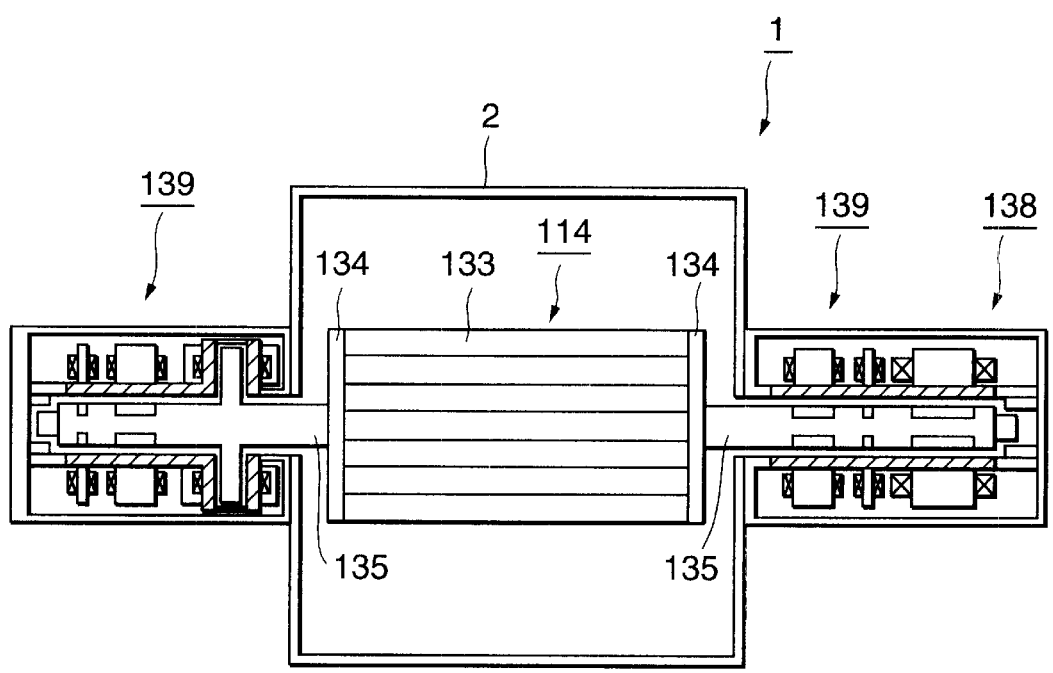
FIG. 10 is a schematic view which shows a structure of a gas laser apparatus in accordance with the conventional art.

Further, at this time, as shown in FIG. 9, the structure may be preferable in the case of being made such that the laser chamber 2 is put within a glove box 51 surrounded by a transparent acrylic resin or glass and the rotational balance is adjusted. An exhaust duct 53 for exhausting is provided in the glove box 51, for example, in an upper portion of the glove box 51, and the glove box 51 can be exhausted by an exhaust fan 54 provided within the exhaust duct 53. Further, an inert gas bomb 55 for introducing a clean inert gas therewithin is connected to the glove box 51 via an inert gas pipe 56. By introducing the inert gas to the inner portion of the glove box 51 while exhausting the inner portion of the glove box 51, the inner portion of the glove box 51 is always filled with the clean inert gas. Then, in this state, the balance weight 37 is attached and detached via gloves 52 and 52 provided on a wall surface of the glove box 51. Accordingly, the air is mixed into the inner portion of the laser chamber 2 at a less chance.

In this case, in the first embodiment mentioned above, the laser chamber 2 can be freely separated into the upper and lower portions, and in the second embodiment, the structure is made such as to be constituted by the main body portion having the open upper portion and the chamber cover portion 2C, however, the structure is not limited to this. That is, the once through fan 14 in accordance with the first embodiment may be used in the laser chamber 2 comprising the main body portion 2D and the chamber cover portion 2C, and the once through fan 14 in accordance with the second embodiment may be used in the vertically separable laser chamber 2.

Further, the screw hole 36 for mounting the balance weight 37 is provided in both of the flat plate surface 34A and the peripheral edge surface 34B of the blade supporting plate 34 by combining the first embodiment with the second embodiment. For example, at a time of adjusting the rotational balance in the single unit of the once through fan 14, the balance weight 37 is mounted to the flat plate surface 34A of the blade supporting plate 34, and it is possible to more delicately adjust the rotational balance by changing the radial distance of the balance weight 37 from the center of the rotary shaft 35. Further, at a time of assembling the once through fan 14 within the laser chamber 2 so as to adjust the rotational balance, the effect described in the second embodiment can be obtained by mounting the balance weight 37 to the screw hole 36 provided on the peripheral edge surface 34B of the blade supporting plate 34.

Further, in the second embodiment, the description is given of the case that the balance weight 37 is mounted only to the blade supporting plates 34 in both end portions of the once through fan 14, however, the structure is not limited to this. That is, the screw hole 36 for mounting the balance weight is provided on the peripheral edge surface of the blade supporting plate 57 by increasing a thickness of the blade supporting plate 57 shown in FIG. 7.

What is claimed is:

1. In a gas laser apparatus having a once through fan for circulating and driving a laser gas charged within a laser chamber, said once through fan comprising blade supporting plates, for supporting a blade portion of the once through fan, having at least one mounting hole arranged on a peripheral edge surface of each said blade supporting plate for mounting a balance weight, and at least one balance weight, for mounting in said at least one mounting hole, for use in adjusting a rotational balance of the once through fan.

2. A gas laser apparatus comprising:

a laser chamber for charging a laser gas;

a once through fan, having blade supporting plates for supporting a blade portion, for circulating and driving the laser gas within the laser chamber;

at least one mounting hole for mounting a balance weight for adjusting a rotational balance of the once through fan provided on each said blade supporting plate; and at least one balance weight for mounting in said at least one mounting hole.

3. A gas laser apparatus as claimed in claim 2, wherein said at least one mounting hole is provided on a peripheral edge surface of each said blade supporting plate.

4. A method of adjusting a rotational balance of a once through fan for a gas laser apparatus for circulating and driving a laser gas charged within a laser chamber, wherein said once through fan has blade supporting plates, for supporting a blade plate of the once through fan, having at least one mounting hole arranged on each said blade supporting plate for mounting a balance weight, and at least one balance weight, for mounting in said at least one mounting hole, for use in adjusting the rotational balance of the once through fan, said method comprising adjusting the rotational balance after attaching said once through fan to an inner portion of said laser chamber.

* * * * *